US008483447B1

(12) United States Patent
Arfvidsson et al.

(10) Patent No.: US 8,483,447 B1
(45) Date of Patent: Jul. 9, 2013

(54) LABELING FEATURES OF MAPS USING ROAD SIGNS

(75) Inventors: Joakim Kristian Olle Arfvidsson, Mountain View, CA (US); Sriram Thirthala, Bangalore (IN)

(73) Assignee: Google Inc., Mountain View, CA (US)

( * ) Notice: Subject to any disclaimer, the term of this patent is extended or adjusted under 35 U.S.C. 154(b) by 469 days.

(21) Appl. No.: 12/898,346

(22) Filed: Oct. 5, 2010

(51) Int. Cl.
*G06K 9/00* (2006.01)
*G06F 3/00* (2006.01)
*G06F 13/00* (2006.01)

(52) U.S. Cl.
USPC .............................. 382/113; 701/409; 725/52

(58) Field of Classification Search
USPC ..................... 382/100, 113; 725/52; 348/113, 348/118; 701/400, 409, 428, 431
See application file for complete search history.

(56) References Cited

U.S. PATENT DOCUMENTS

| 7,634,463 | B1 * | 12/2009 | Katragadda et al. | 701/431 |
| 8,218,913 | B1 * | 7/2012 | Thirthala et al. | 382/317 |
| 8,244,459 | B2 * | 8/2012 | Bowman et al. | 701/400 |
| 2008/0075367 | A1 * | 3/2008 | Winn et al. | 382/180 |

OTHER PUBLICATIONS

Chen, Ching-Chien. Automatically and accurately conflating road vector data, street maps and orthoimagery. Diss. University of Southern California, 2005.*
Haklay, Mordechai, and Patrick Weber. "Openstreetmap: User-generated street maps." Pervasive Computing, IEEE 7.4 (2008): 12-18.*
Wu, Wen, Xilin Chen, and Jie Yang. "Incremental detection of text on road signs from video with application to a driving assistant system." Proceedings of the 12th annual ACM international conference on Multimedia. ACM, 2004.*

* cited by examiner

*Primary Examiner* — Shefali Goradia
(74) *Attorney, Agent, or Firm* — Fenwick & West LLP

(57) ABSTRACT

Digital maps of roads are labeled with features based on information from images of road signs. A segment of a road network with an unlabeled feature is identified, and a street view image of the road segment taken from a known location is generated. An image of a road sign is captured from within the generated street view image and presented in association with the road segment to a user. A label for the unlabeled feature of the road segment is received and stored.

30 Claims, 8 Drawing Sheets

LABELING FEATURES OF MAPS USING ROAD SIGNS

BACKGROUND

1. Field of Art

The present invention generally relates to the field of generating maps, and more specifically to identifying and using street signs to label maps.

2. Background of the Invention

Digital maps, such as those provided by GOOGLE INC., are used in a wide variety of electronic devices, such as car navigation systems and mobile phones. Users rely on digital maps to provide comprehensive and accurate information about roads for purposes including navigation and route guidance. Generating a digital map of roads for use in such devices requires gathering large amounts of data about the roads and labeling the roads in ways that permit use by electronic devices. The labeling process is extremely resource intensive. Therefore, there is a general need for ways to increase the efficiency of labeling roads in digital maps.

SUMMARY

The above and other needs are met by methods, systems, and computer-readable storage media for labeling features of digital maps using information from images of road signs.

One aspect provides a computer-implemented method for labeling features of digital maps using information from images of road signs. Embodiments of the method comprise identifying a segment of a road network with an unlabeled feature and generating an image based at least in part on street view imagery of the road segment. The street view imagery includes images associated with the road segment that are captured from known locations. The method further comprises capturing an image of a road sign displayed within the generated image and presenting the image of the road sign in association with the road segment having the unlabeled feature. Responsive to presenting the image of the road sign, the method comprises receiving a label for the unlabeled feature of the road segment and storing the label.

Another aspect provides a computer system for labeling a feature of a digital map using information from images of road signs. The computer system comprises a computer processor and a computer program executable by the computer processor that performs actions comprising identifying a segment of a road network with an unlabeled feature. The computer program actions further comprising generating an image based at least in part on street view imagery of the road segment and capturing an image of a road sign displayed within the generated image, presenting the image of the road sign in association with the road segment having an unlabeled feature, receiving a label for the unlabeled feature, and storing the label.

Still another aspect provides a non-transitory computer-readable storage medium storing executable computer program instructions for labeling a feature of a digital map using information from road signs. The computer-readable storage medium stores computer program instructions comprising instructions for identifying a segment of a road network having an unlabeled feature and generating an image based at least in part on street view imagery associated with the road network. The computer-readable storage medium further comprises computer program instructions for capturing an image of a road sign displayed within the generated image and presenting the image of the road sign in association with the road segment having the unlabeled feature. Responsive to presenting the image of the road sign, the computer-readable storage medium comprises computer program instructions for receiving the label for the unlabeled feature and storing the label.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
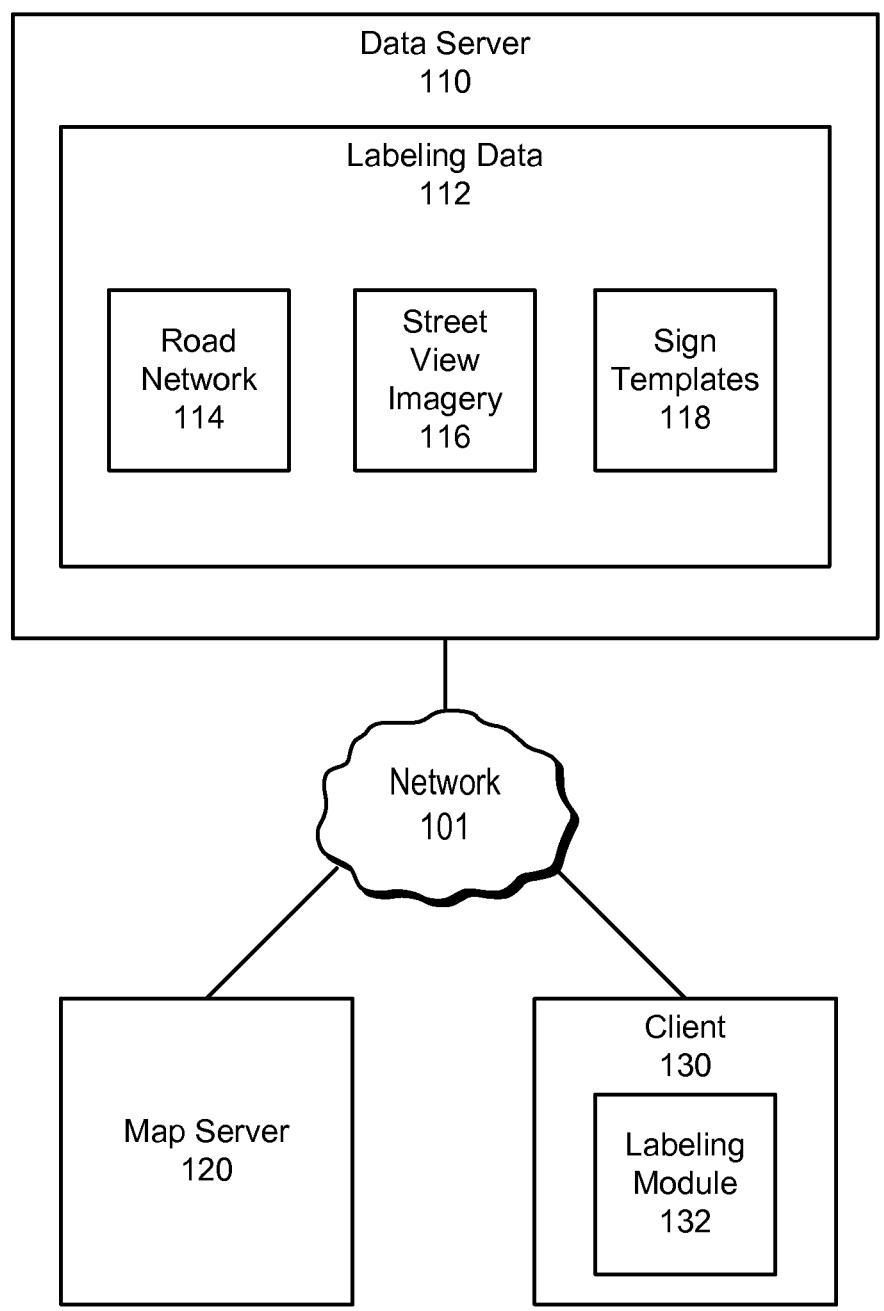
FIG. 1 is a high-level block diagram of the system environment according to one embodiment of the present disclosure.

FIG. 1 is a high-level block diagram that illustrates a system environment 100 for labeling a digital map according to one embodiment. As shown, the system environment 100 includes a network 101, a data server 110, a map server 120 and a client 130. While only one of each entity is shown in FIG. 1 for clarity, embodiments can have multiple servers 110, 120 and many clients 130.

The network 101 represents the communication pathway between the data server 110, the map server 120, and the client 130. In one embodiment, the network 101 uses standard communications technologies and/or protocols and can include the Internet as well as mobile telephone networks. Thus, the network 101 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 101 can use custom and/or dedicated data communications technologies instead of, or in addition to, the ones described above.

The data server 110 stores labeling data 112 for use in labeling roads and other aspects of maps. The labeling data 112 are stored in one or more databases such as relational and other types of databases. In one embodiment, the labeling data 112 include a road network 114, street view imagery 116, and sign templates 118. The labeling data 112 can also include different and/or additional types of data, such as satellite imagery. The data server 110 can also store labeled maps.

The road network data 114 describe roads within a specified geographic area of a map, such as a city, state, country, or continent. In one embodiment, the road network data 114 describe features of the roads including the roads' geographic locations and intersections. However, the road network data 114 lack other features, such as the roads' names, directions of permitted travel, and speed limits. In general, these missing features must be supplied if the road network is to be used for navigation.

The street view imagery data 116 contain images captured from known geographic locations on the roads described by the road network data 114. The images describe the visual environment of the roads from the perspective of a person travelling on the roads. In one embodiment, the street view imagery data 116 are captured by specially-equipped vehicles that travel along the roads and capture images from multiple perspectives. The images are tagged with location information describing the geographic locations from which the images were captured. The images from a single location can be combined to provide a 360 degree panorama of the environment from that location on the road. As such, the images will reveal any signs that are visible from the road at that location.

The sign templates data 118 describe road signs that can appear in the street view imagery data 116. In one embodiment, the sign templates data 118 are used to support automated identification of such signs in the imagery. To this end, the sign templates data 118 describe features of standard road signs, such as the shape, color, text position, and symbols that commonly appear on such signs. The signs can show, for example, street names, driving restrictions, stops, and speed limits. The sign template data 118 can also include sign templates at a variety of scales (i.e., sizes). In some embodiments the sign template data 118 are absent.

The client 130 is a computer or other electronic device used by one or more users to perform activities including using the street view imagery data 116 to label roads in the road network 114 to produce a labeled map. In one embodiment, there are multiple clients 130 in communication with the data server 110, and each client is used by a different user to label roads. For example, the road network 114 can be divided into multiple portions, and the portions can be distributed to the multiple clients 130, thereby allowing multiple users to work in parallel to label road segments.

The client 130 includes a labeling module 132 that supports the labeling functionality. The labeling module 132 provides the user with an interface with which the user can interact to view and manipulate labeling data 112 provided by the data server 110, and to provide data describing the labeled roads to the data server 110 and/or map server 120. The labeling module 132 can be, for example, standalone software or integrated into a web browser or other tool at the client 130.

In one embodiment, a user uses the labeling module 132 to label a given road segment of the road network 114 by using the street view imagery 116 to identify a road sign in proximity to the road segment. The road sign can be identified in the street view imagery 116 using an automated or manual process. Once the road sign is identified, the labeling module 132 creates a display that visually depicts the road sign in a given orientation relative to the road segment. The user uses the visual depiction to identify features of the road segment, such as the name of the road, and to label the road segment with the identified features. The labeling module 132 sends data describing the labeled road segment to the data server 110 and/or map server 120 for storage as a labeled map.

The map server 120 uses the labeled road segments to provide mapping services. For example, the map server 120 can provide labeled maps as part of a web-based mapping service. Similarly, the map server 120 can make labeled maps available to manufactures of electronic devices such as vehicle navigation systems. In one embodiment, the maps provided by the map server 120 illustrate the road network 114 and the attendant features labeled by the users of the labeling modules 132 at the clients 130.

Figure 2:
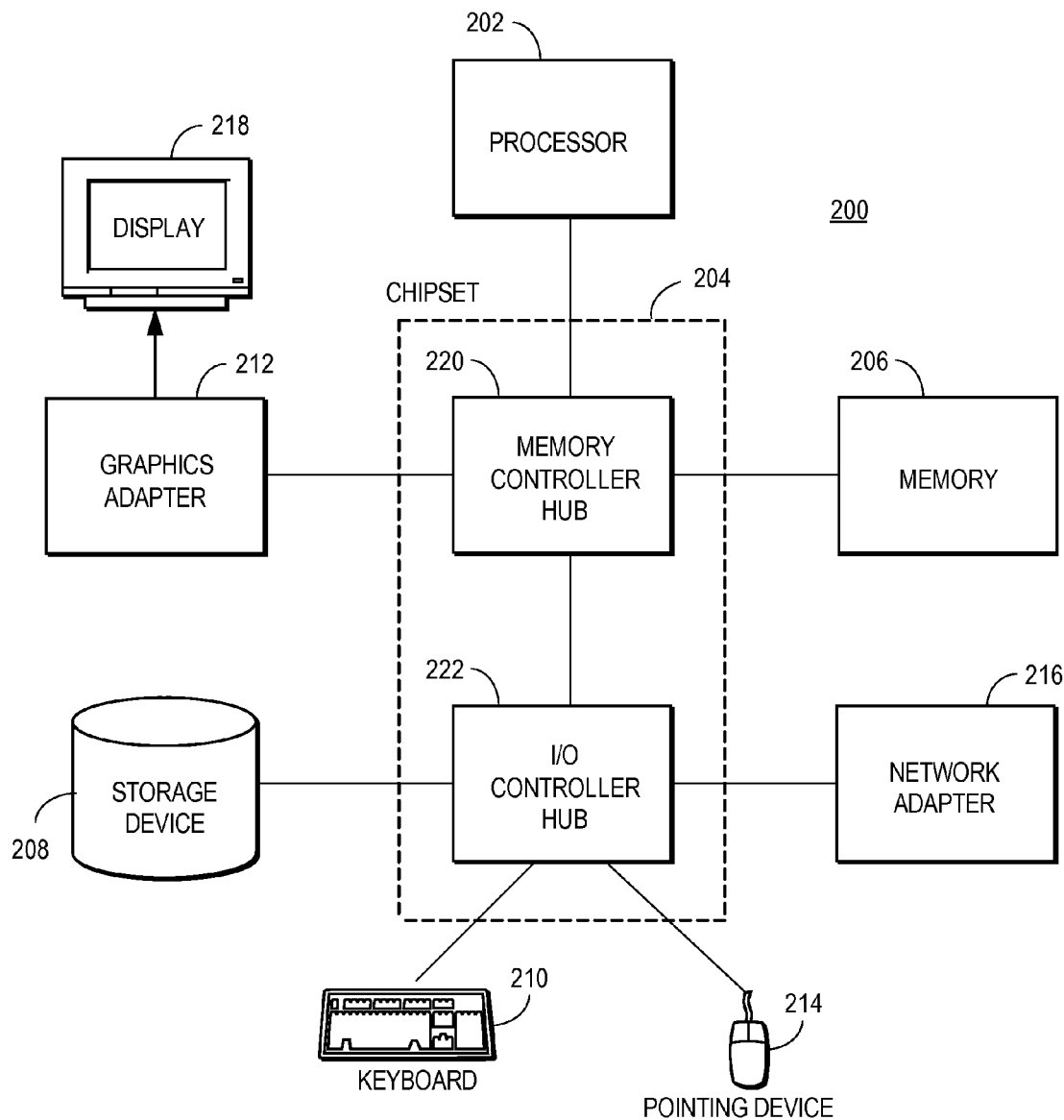
FIG. 2 is a high-level block diagram illustrating an example of a computer for use in the system environment shown in FIG. 1 according to one embodiment of the present disclosure.

FIG. 2 is a high-level block diagram illustrating an example of a computer 200 for use as a data server 110, a map server 120 or a client 130, in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 101. Some embodiments of the computer 200 have different and/or other components than those shown in FIG. 2. For example, the data server 110 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
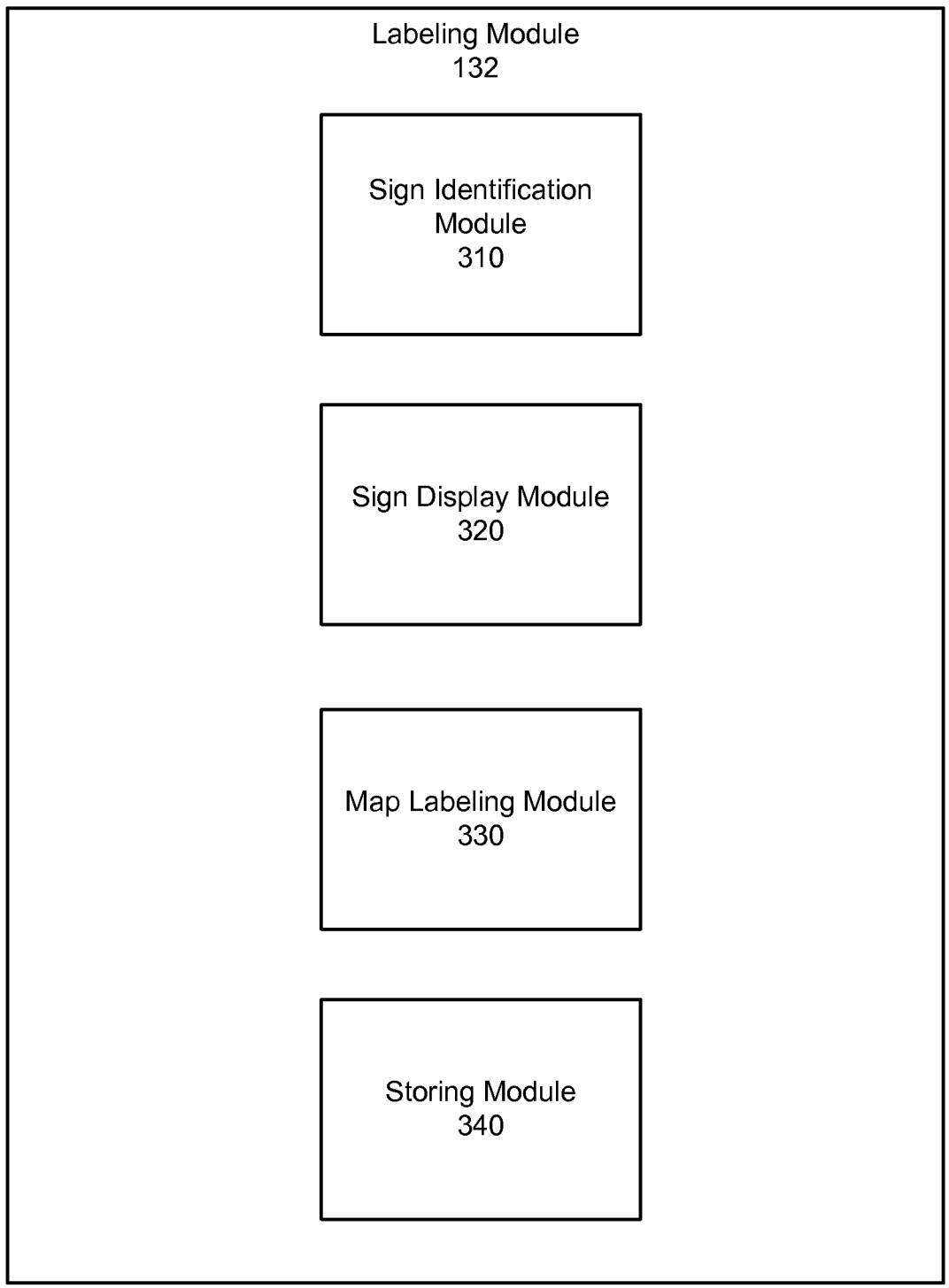
FIG. 3 is a high-level block diagram illustrating modules within the labeling module according to one embodiment of the present disclosure.

FIG. 3 shows a high-level block diagram illustrating modules within the labeling module 132 according to one embodiment. The labeling module 132 includes a sign identification module 310, a sign display module 320, a map labeling module 330, and a storing module 340. In some embodiments, the functions are distributed among these modules in a different manner than described herein. In addition, some embodiments have different and/or additional modules than the ones shown in FIG. 3. Furthermore, one or more functions attributed to the modules within the labeling module 132 can be performed by entities other than the client 130.

The sign identification module 310 identifies road signs that appear within the street view imagery 116. Depending upon the embodiment, the sign identification process can be performed with manual assistance or as a fully automated process. In general, the sign identification module 310 identifies signs for a given segment of the road network 114 needing labeling. For example, the sign identification module 310 can receive from the data server 110 the portion of the road network 114 describing the intersection, and the street view imagery data 116 from segments of roads including and adjacent to the intersection.

The sign identification module 310 identifies the signs that are relevant for labeling features of the roads in the provided subset of the road network (e.g., the intersecting roads). In the manual embodiment, the sign identification module 310 provides the user with an interface that allows the user to view street view imagery 116 likely to show signage describing the features of the road to be labeled. Thus, the user can use the sign identification module 310 to view the street view imagery 116 of a segment of road leading to the intersection since the road segment is likely to have a sign describing the intersecting streets. The user visually identifies one or more signs in the street view imagery 116 describing features of a road for which labeling is required and uses a selection tool provided by the sign identification module 310 to select the portion of the street view imagery 116 showing the signs.

Upon receiving the selections, the sign identification module 310 captures, e.g., extracts, images of the selected signs. The labeling module 132 stores the sign images in the data server 110 or elsewhere in the system 110. In addition, the labeling module 132 stores metadata describing the signs, such as the locations of the signs as indicated by the street view imagery from which the sign images were captured and/or based on input from the user. In one embodiment, the location of a sign is set as a fixed distance, e.g., 10 feet, from the location from which the street view imagery 116 was captured. The automated sign identification process performed by the sign identification module 310 is described with respect to FIG. 5 and likewise results in storing images of signs along with associated metadata.

The sign display module 320 displays the stored sign images on a map in an orientation that facilitates labeling features of the roads on the map. In one embodiment, the sign display module 320 generates a map showing the segment of the road network being labeled. The map shows the road network from the top-down perspective and thus resembles a conventional road map. In addition, the sign display module 320 shows the sign images selected by the user for that segment of the road network on the map. In one embodiment, the sign images are displayed at locations corresponding to the signs' real geographic locations. Moreover, an embodiment of the sign display module 320 displays the signs face-up, oriented to reflect the perspective of a viewer on the road from which the sign image was captured.

Figure 4:
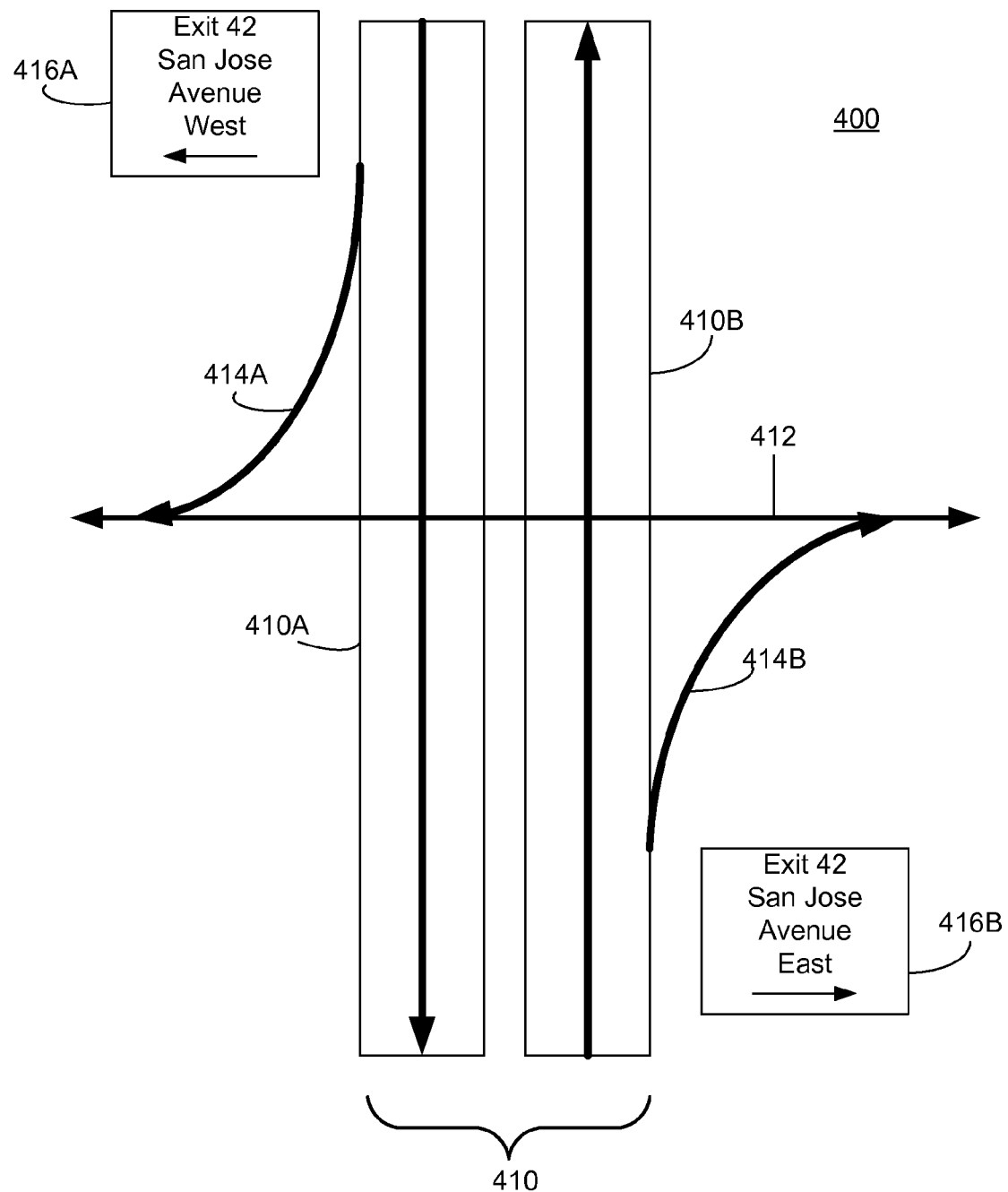
FIG. 4 is a diagram of map illustrating an example of a map with street signs generated by the sign display module according to one embodiment of the present disclosure.

FIG. 4 is a diagram illustrating an example of a map 400 with street signs generated by the sign display module 320. The example map 400 shows a segment of the road network from a top-down perspective and illustrates a highway 410 having a southbound segment 410A and a northbound segment 410B. The highway 410 traverses an east-west road 412. The southbound 410A portion of the highway has an exit 414A that allows a vehicle on the highway to head west on the road 412 while the northbound 410B portion of the highway has an exit 414B that allows a vehicle on the highway to head east on the road.

The example map 400 illustrates signs 416 adjacent to the highway 410 near each of the exits 414. The sign 416A on the southbound highway 410A displays the text "Exit 42 San Jose Ave West" and illustrates an arrow indicating the direction of the exit. Similarly, the sign 416B on the northbound highway 410B displays the text "Exit 42 San Jose Ave East" and also illustrates an arrow. Both signs 416 are oriented by the sign display module 320 so that the arrows on the signs point in the same direction that the arrows would appear to point to a person on the respective highway segments.

Referring back to FIG. 3, the map labeling module 330 permits a user of the labeling module 132 to label features of the road segment illustrated in the map displayed by the sign display module 320. In one embodiment, the map labeling module 330 displays a user interface which the user can use to select a road segment and specify features of that segment. For example, a user viewing the map 400 displayed in FIG. 4 can use the functionality of the map labeling module 330 to select road 412 and indicate that the name of the road is "San Jose Avenue." Likewise, the user can select the road segment forming exit 414B and label it as "Exit 42, San Jose Ave East." In the same manner, the user can use the map labeling module 330 to label other features shown by signs, such as speed limits, one-way restrictions, carpool restrictions, etc.

Because the signs on the map 400 are oriented to reflect the perspective of a person on the associated road segment, it is apparent to the user as to which roads and directions the signs pertain. As a result, it is relatively easy and quick for the user to label the features of the road segments. Mistakes that might occur using other techniques are eliminated. Accordingly, the map labeling module 330 in combination with the other modules of the labeling module 132 allows for high-quality labeling relative to other techniques.

The storing module 340 stores the labeled road segments in a database. The location of the database can vary in different embodiments. For example, the database can be within the data server 110, the map server 120, or elsewhere. The database can be a relational or other type of database. After the labeled road segments are stored, the labeled road segments are used for generating maps provided by the map server 120 and/or for other purposes.

Figure 5:
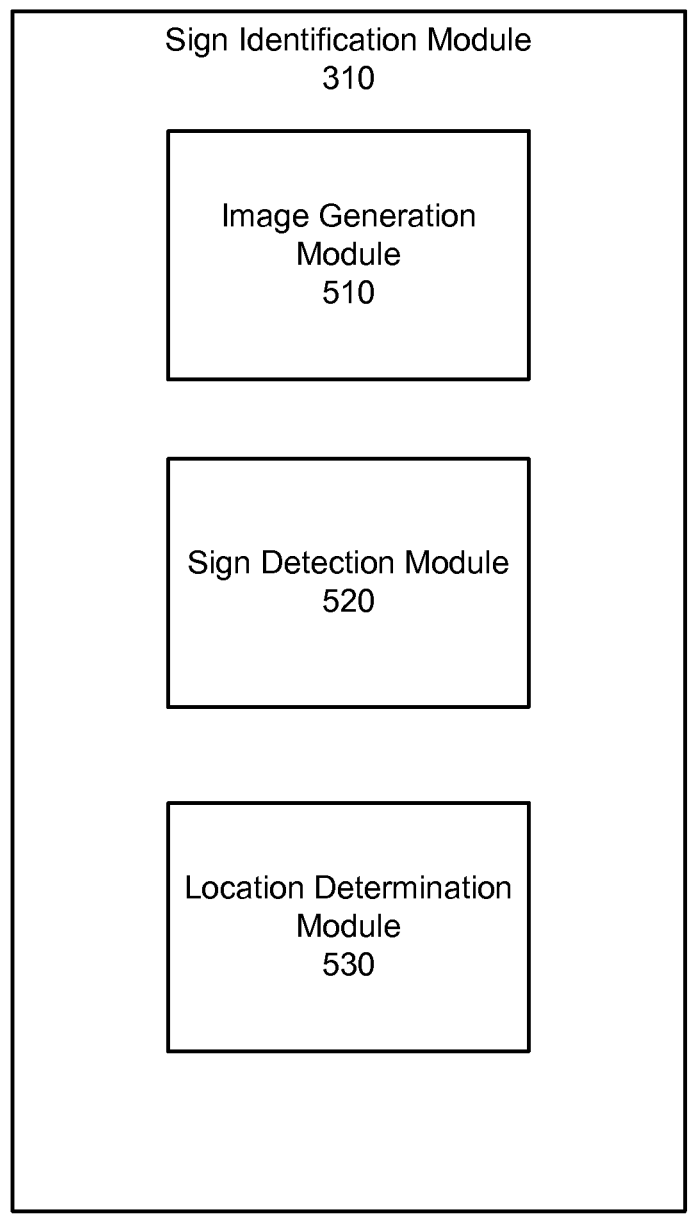
FIG. 5 is a high-level block diagram illustrating modules within the sign identification module for performing automated sign identification according to one embodiment of the present disclosure.

FIG. 5 is a high-level block diagram illustrating modules within the sign identification module 310 according to one embodiment. The sign identification module 310 of FIG. 5 includes modules for performing automated sign identification, including an image generation module 510, a sign detection module 520, and a location determination module 530. Other embodiments can include different and/or additional modules.

The image generation module 510 generates images from the street view imagery data 116 that are used to detect signs.

In one embodiment, the image generation module 510 receives street view imagery data 116 from a particular location or locations of a road segment from the road network 114, such as imagery near a particular intersection. For a given location, the street view imagery 116 forms a panoramic image showing a 360 degree perspective of the street view at the selected location. The image generation module 510 uses this panorama to generate images showing particular viewpoints. For example, the image generation module 510 can select viewpoints in the image panorama that are likely to include road signs and form an image from a subset of the panorama.

The sign detection module 520 detects road signs within the viewpoint images produced by the image generation module 510. In one embodiment, the sign detection module 520 detects signs using a two-part process. Initially, the sign detection module 520 uses templates in the sign template data 118 to detect possible matches in a viewpoint image using a coarse-grained analysis. Then, for possible matches, the sign detection module 520 again uses templates to positively identify signs using a fine-grained analysis. The matching process is metric invariant, meaning that it detects matches irrespective of differences caused by scaling or rotation.

For coarse-grained matching, the sign detection module 520 selects an initial template from the sign template data 118. The sign template can be, for example, a 100×100 pixel image of a sign of a specified type (e.g., a street name sign template). The sign detection module 520 compares the sign template with the viewpoint image by sliding the sign template across in the image. At each location of the sign template, the sign detection module 520 computes a matching score indicating how well the circumscribed portion of the image correlates with the template. In one embodiment, correlation is measured by the differences in pixel intensities. The correlation can also use other features, such as whether shapes, patterns, symbols, or text sizes within the portion of the image correlate with the sign template. The sign detection module 520 can use zero mean normalized cross correlation-based techniques to compute the matching score.

In one embodiment, the sign detection module 520 compares multiple scales of the template with the viewpoint image as part of the coarse-grained matching. The sign detection module 520 compares differently-scaled versions of the sign template with the viewpoint image and generates a matching score for each image location for each sign template. This technique enables the sign detection module 520 to detect signs of different sizes in the image, such as signs that appear small because they are far away from the location at which the street view image was captured.

The sign detection module 520 uses the matching scores produced by the coarse-grained matching to identify candidate locations of signs in the image. In one embodiment, the candidate locations are determined by comparing the matching scores to a threshold. The threshold itself can be relatively easy to meet, such that it is more likely that non-sign locations are included than correct sign locations are excluded.

Once the candidate sign locations are determined using coarse-grained matching, an embodiment of the sign detection module 520 uses fine-grained matching to determine the size and orientation of any signs in the image. To determine the size of a possible sign at a candidate location, the sign detection module 520 applies finer-grained scaled templates to the candidate location. For example, assume that the sign detection module 520 has 100 possible scales for a sign template. During coarse-grained matching, the sign detection module 520 compares the image with ten different scales of the sign template and one of the scales produces a matching score that indicates a candidate location. For this candidate location, the sign detection module 520 attempts to improve the matching score by using more refined scales of the sign template. Thus, if scale "50" identifies a candidate sign location during coarse-grained matching, the sign detection module 520 applies scales "49" and "51" (and possibly other scales such as "40"-"49" and "51"-"60") to the location during fine-grained matching to identify the scale that produces the best matching score.

Once the scale of the sign template that produces the best matching score is determined, the sign detection module 520 attempts to improve on the matching score by comparing different orientations of the sign template (having the best-matching scale) with the candidate location. In one embodiment, the sign detection module 520 rotates the sign template about its center axis and compares the rotated sign template with the candidate location to identify the rotation (orientation) that produces the best matching score. If the best matching score for a given scale and orientation exceeds a threshold, the sign detection module 520 declares that a sign with the scale and orientation is present at the candidate location in the viewpoint image. The sign detection module 450 then captures an image of the road sign and sends the image of the sign and associated metadata to the sign display module 320 for display and/or the storing module 340 for storage.

Other embodiments of the sign detection module 520 use different techniques to detect signs in viewpoint images. Rather than using coarse- and fine-grained matching phases, the sign detection module 520 can use a single-phase matching technique that detects matches for any given scale and orientation. For example, the sign detection module 520 can use scale and/or orientation invariant keypoint-based matching techniques. One such technique uses the Scale-invariant Feature Transform (SIFT). SIFT transforms an image into a collection of feature vectors which are invariant to image translation, scaling, and rotation.

The location determination module 530 determines the geographic locations of signs detected by the sign detection module 520. The location determination module 530 uses the scale and orientation data, along with position data associated with the street view imagery 116 from which the viewpoint image showing a sign was created, to determine the geographic position of the sign. Since the location from which the street view imagery 116 was captured is known, the location determination module 350 can determine the bearing of the sign relative to the street view image capture location. In addition, the location determination module 350 can use the scale of the matching template to estimate the distance to the sign from the street view image capture location. The location determination module 530 sends the location of the sign to the sign display module 320 for display and/or the storing module 340 for storage in association with the image of the sign.

If the sign detection module 520 is applied to multiple viewpoint images showing the same sign from different viewpoints, additional techniques can be used to determine the location of the sign. In one embodiment, the location determination module 530 uses clustering to determine a sign location. The location determination module 530 calculates the location of each sign instance independently based on the street view imagery, scale, and orientation. The calculated locations of the sign from the multiple images are then plotted on a map to form a cluster of possible locations. The location determination module 530 analyzes the cluster to identify the location of the sign. For example, the location determination module 530 can use the centroid of the cluster as the location of the sign. Other embodiments of the location determination module 530 use different techniques, such as performing a triangulation technique based on images of a sign that appear in three or more viewpoint images.

Figure 6:
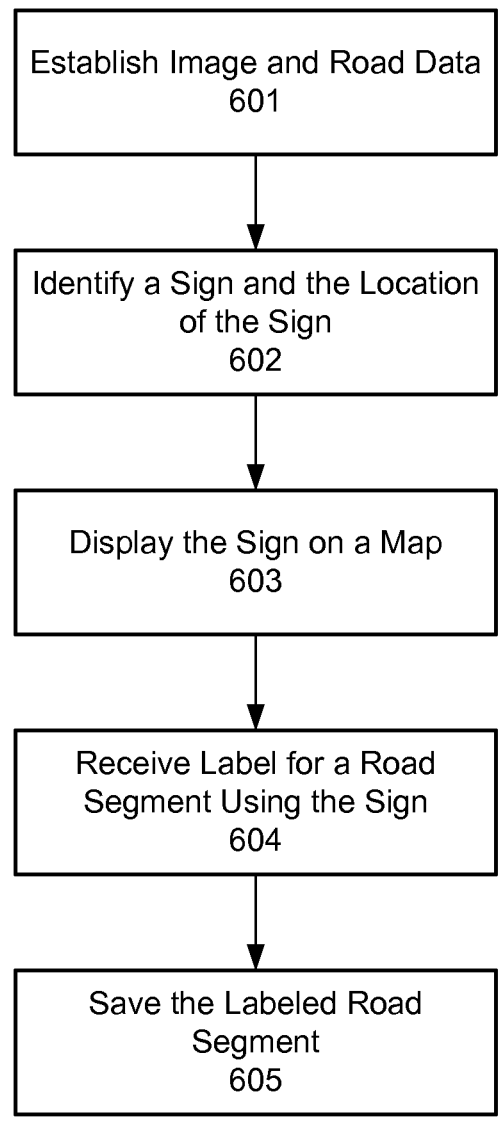
FIG. 6 is a flow diagram illustrating a process for identifying and using road signs to label features on a map according to one embodiment of the present disclosure.

FIG. 6 is a flow diagram illustrating a process 600 for identifying and using road signs to label features on a map, according to one embodiment. Other embodiments can include different and/or additional steps than the ones described herein. A road network 114 having a segment with missing features and a street view imagery 116 associated with the road segment are established 601. For example, the labeling module 132 can identify a segment of the road network having features needing labeling. The labeling module 132 identifies 602 a sign in the image. The sign can be identified using manual or automated techniques. The labeling module 132 also identifies 602 the location of the sign. Next, the labeling module 132 displays 603 the sign on a map showing the road segment. The sign is displayed face-up, in an orientation that shows the orientation in which a viewer on the road would see the sign. Next, the labeling module 132 receives 604 a label for a road segment based on the information provided on the sign. For example, a user of the labeling module 132 can view the sign displayed on the map and use the sign data to label a feature of the map. In addition, a second quality control user verifies with the first user correctly labeled the feature of the map using the sign. The labeling module 132 saves 605 the labeled road segment in the data server 110, map server 120, or elsewhere. The labeled road segment can be used to produce electronic maps and/or for other purposes.

Figure 7:
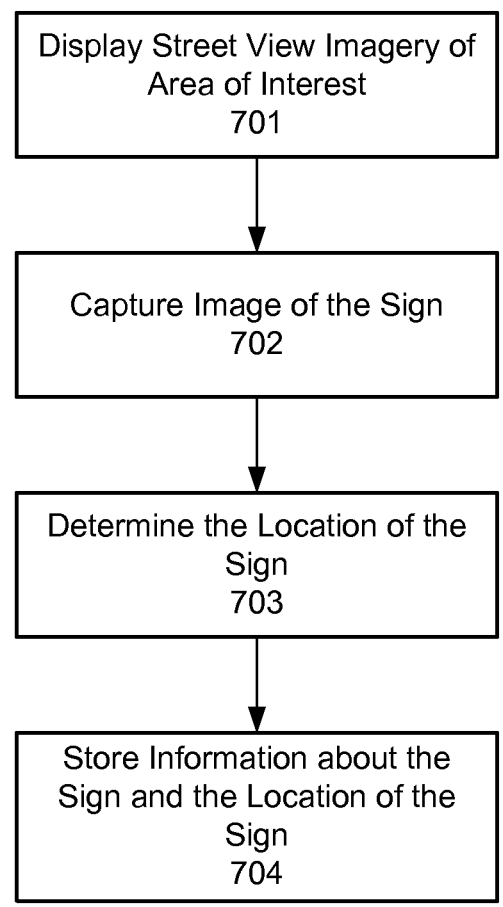
FIG. 7 is a flow diagram illustrating a process for identifying a sign and a location of a sign using user input according to one embodiment of the present disclosure.

FIG. 7 is a flow diagram illustrating a process 700 for identifying 602 a sign and a location of a sign using user input, according to one embodiment. Other embodiments can include different and/or additional steps than the ones described herein. The labeling module 132 displays 701 street view imagery 116 showing an area of interest, e.g., showing an area proximate to the road segment having the feature being labeled. A user views the street view imagery 116 and uses a user interface provided by the labeling module 132 to select an image of a sign from the street view imagery. The labeling module 132 captures 702 the selected image of the sign from the street view imagery 116 and determines 703 the location of the sign based on the location of street view imagery 116 and/or user input. The labeling module 132 stores 704 information about the sign and the location of the sign in the data server 110, map server 120, or elsewhere.

Figure 8:
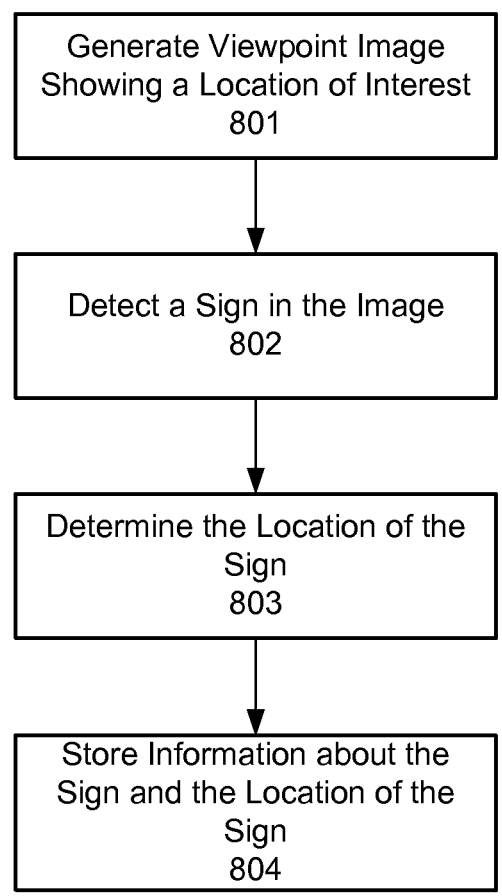
FIG. 8 is a flow diagram illustrating a process for identifying a sign and a location of a sign using an automated process according to one embodiment of the present disclosure.

FIG. 8 is a flow diagram illustrating a process 800 for identifying 602 a sign and a location of a sign using an automated process, according to one embodiment. Other embodiments can include different and/or additional steps than the ones described herein. The labeling module 132 generates 801 a viewpoint image showing an area of interest, e.g., showing an area proximate to the road segment having the feature being labeled. The labeling module 132 detects 802 a sign in the image. In one embodiment, the labeling module 132 uses templates to initially detect a candidate location of a sign in the image. Then, the labeling module 132 uses additional templates to more precisely determine whether there is a sign at the candidate location, and the orientation of the sign, if one exists. The sign identification module 310 then determines 803 the location of the sign using the known location of the street view imagery 116, clustering, triangulation, and/or other techniques. The labeling module 132 stores 804 information about the sign and the location of the sign at a data server 110 or map server 120, or elsewhere.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative steps for methods for identifying and using street signs for labeling maps through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method disclosed herein without departing from the spirit and scope defined in the appended claims.

What is claimed is:

1. A method of labeling a feature of a digital map, the method comprising:
   using a computer to perform steps comprising:
   identifying a segment of a road network having an unlabeled feature;
   generating an image based at least in part on street view imagery having images captured from known locations associated with the road network having the unlabeled feature;
   capturing an image of a road sign displayed within the generated image;
   presenting the image of the road sign in association with the segment of the road network having the unlabeled feature;
   receiving a label for the unlabeled feature responsive to presenting the image of the road sign; and
   storing the label.

2. The method of claim 1, wherein generating the image comprises:
displaying street view imagery likely to show a road sign describing the unlabeled feature, wherein the street view imagery likely to show the road sign is captured by a vehicle traveling on a road of the road network.

3. The method of claim 1, wherein generating the image comprises:
generating a viewpoint image based at least in part on the street view imagery, the viewpoint image likely to show a road sign describing the unlabeled feature.

4. The method of claim 3, wherein capturing the image of the road sign comprises:
identifying a sign template for a road sign describing the unlabeled feature; and
using the sign template to detect the road sign describing the unlabeled feature in the viewpoint image.

5. The method of claim 3, wherein capturing the image of the road sign comprises:
using one or more sign templates for a road sign describing the unlabeled feature to perform a coarse-grained analysis of the viewpoint image, the coarse-grained analysis identifying a candidate location of the road sign describing the unlabeled feature in the viewpoint image; and
using the one or more sign templates for the road sign describing the unlabeled feature to perform a fine-grained analysis of the candidate location of the road sign, the fine-grained analysis indicating a scale and an orientation of the road sign in the viewpoint image.

6. The method of claim 1, wherein capturing the image of the road sign comprises:
receiving a user selection of a portion of the generated image based at least in part on the street view imagery, the portion of the generated image including the image of the road sign;
extracting the portion of the generated image including the image of the road sign; and
storing the extracted portion including the image of the road sign.

7. The method of claim 1, wherein presenting the image of the road sign in association with the segment of the road network having the unlabeled feature comprises:
generating a map showing the segment of the road network having the unlabeled feature; and
displaying the image of the road sign on the map, wherein the image of the road sign is displayed face-up, oriented to reflect a perspective of a viewer at a location from which a street view image showing the road sign was captured.

8. The method of claim 1, further comprising:
determining a geographic location of the road sign displayed within the generated image;
wherein presenting the image of the road sign in association with the segment of the road network comprises displaying a map showing the segment of the road network and showing the image of the road sign at a location on the map determined responsive to the geographic location of the road sign.

9. The method of claim 8, wherein determining the geographic location of the road sign comprises:
determining the geographic location of the road sign based at least in part on a known location from which a street view image showing the road sign was captured and a scale of the road sign in the street view image.

10. The method of claim 1, wherein receiving the label for the unlabeled feature comprises receiving a name of a road.

11. A computer system for labeling a feature of a digital map, the system comprising:
a computer processor; and
a computer program executable by the computer processor and performing actions comprising:
identifying a segment of a road network having an unlabeled feature;
generating an image based at least in part on street view imagery having images captured from known locations associated with the road network having the unlabeled feature;
capturing an image of a road sign displayed within the generated image;
presenting the image of the road sign in association with the segment of the road network having the unlabeled feature;
receiving a label for the unlabeled feature responsive to presenting the image of the road sign; and
storing the label.

12. The system of claim 11, wherein generating the image comprises:
displaying street view imagery likely to show a road sign describing the unlabeled feature, wherein the street view imagery likely to show the road sign is captured by a vehicle traveling on a road of the road network.

13. The system of claim 11, wherein generating the image comprises:
generating a viewpoint image based at least in part on the street view imagery, the viewpoint image likely to show a road sign describing the unlabeled feature.

14. The system of claim 13, wherein capturing the image of the road sign comprises:
identifying a sign template for a road sign describing the unlabeled feature; and
using the sign template to detect the road sign describing the unlabeled feature in the viewpoint image.

15. The system of claim 13, wherein capturing the image of the road sign comprises:
using one or more sign templates for a road sign describing the unlabeled feature to perform a coarse-grained analysis of the viewpoint image, the coarse-grained analysis identifying a candidate location of the road sign describing the unlabeled feature in the viewpoint image; and
using the one or more sign templates for the road sign describing the unlabeled feature to perform a fine-grained analysis of the candidate location of the road sign, the fine-grained analysis indicating a scale and an orientation of the road sign in the image.

16. The system of claim 11, wherein capturing the image of the road sign comprises:
receiving a user selection of a portion of the generated image based at least in part on the street view imagery, the portion of the generated image including the image of the road sign;
extracting the portion of the generated image including the image of the road sign; and
storing the extracted portion including the image of the road sign.

17. The system of claim 11, wherein presenting the image of the road sign in association with the segment of the road network having the unlabeled feature comprises:
generating a map showing the segment of the road network having the unlabeled feature; and
displaying the image of the road sign on the map, wherein the image of the road sign is displayed face-up, oriented to reflect a perspective of a viewer at a location from which a street view image showing the road sign was captured.

18. The system of claim 11, further comprising:
determining a geographic location of the road sign displayed within the generated image;
wherein presenting the image of the road sign in association with the segment of the road network comprises displaying a map showing the segment of the road network and showing the image of the road sign at a location on the map determined responsive to the geographic location of the road sign.

19. The system of claim 18, wherein determining the geographic location of the road sign comprises:
determining the geographic location of the road sign based at least in part on a known location from which a street view image showing the road sign was captured and a scale of the road sign in the street view image.

20. The system of claim 11, wherein receiving the label for the unlabeled feature comprises receiving a name of a road.

21. A non-transitory computer-readable storage medium storing executable computer program instructions for labeling a feature of a digital map, the computer program instructions comprising instructions for:
identifying a segment of a road network having an unlabeled feature;
generating an image based at least in part on street view imagery having images captured from known locations associated with the road network having the unlabeled feature;
capturing an image of a road sign displayed within the generated image;
presenting the image of the road sign in association with the segment of the road network having the unlabeled feature;
receiving a label for the unlabeled feature responsive to presenting the image of the road sign; and
storing the label.

22. The computer-readable storage medium of claim 21, wherein generating the image comprises:
displaying street view imagery likely to show a road sign describing the unlabeled feature, wherein the street view imagery likely to show the road sign is captured by a vehicle traveling on a road of the road network.

23. The computer-readable storage medium of claim 21, wherein generating the image comprises:
generating a viewpoint image based at least in part on the street view imagery, the viewpoint image likely to show a road sign describing the unlabeled feature.

24. The computer-readable storage medium of claim 23, wherein capturing the image of the road sign comprises:
identifying a sign template for a road sign describing the unlabeled feature; and
using the sign template to detect the road sign describing the unlabeled feature in the viewpoint image.

25. The computer-readable storage medium of claim 23, wherein capturing the image of the road sign comprises:
using one or more sign templates for a road sign describing the unlabeled feature to perform a coarse-grained analysis of the viewpoint image, the coarse-grained analysis identifying a candidate location of the road sign describing the unlabeled feature in the viewpoint image; and
using the one or more sign templates for the road sign describing the unlabeled feature to perform a fine-grained analysis of the candidate location of the road sign, the fine-grained analysis indicating a scale and an orientation of the road sign in the image.

26. The computer-readable storage medium of claim 21, wherein capturing the image of the road sign comprises:
receiving a user selection of a portion of the generated image based at least in part on the street view imagery, the portion of the generated image including the image of the road sign;
extracting the portion of the generated image including the image of the road sign; and
storing the extracted portion including the image of the road sign.

27. The computer-readable storage medium of claim 21, wherein presenting the image of the road sign in association with the segment of the road network having the unlabeled feature comprises:
generating a map showing the segment of the road network having the unlabeled feature; and
displaying the image of the road sign on the map, wherein the image of the road sign is displayed face-up, oriented to reflect a perspective of a viewer at a location from which a street view image showing the road sign was captured.

28. The computer-readable storage medium of claim 21, further comprising instructions for:
determining a geographic location of the road sign displayed within the generated image;
wherein presenting the image of the road sign in association with the segment of the road network comprises displaying a map showing the segment of the road network and showing the image of the road sign at a location on the map determined responsive to the road sign's geographic location.

29. The computer-readable storage medium of claim 28, wherein determining the geographic location of the road sign comprises:
determining the geographic location of the road sign based at least in part on a known location from which a street view image showing the road sign was captured and a scale of the road sign in the street view image.

30. The computer-readable storage medium of claim 21, wherein receiving the label for the unlabeled feature comprises receiving a name of a road.

* * * * *